(12) United States Patent
Yamamoto et al.

(10) Patent No.: US 8,117,816 B2
(45) Date of Patent: Feb. 21, 2012

(54) MULTIFILAMENT AND METHOD FOR MANUFACTURING THE SAME, AND YARN AND METHOD FOR MANUFACTURING THE SAME

(75) Inventors: Yasuhisa Yamamoto, Nobeoka (JP); Eric Eun-Ha Choi, Fukuoka (JP)

(73) Assignee: Duel Co., Inc., Fukuoka (JP)

( * ) Notice: Subject to any disclaimer, the term of this patent is extended or adjusted under 35 U.S.C. 154(b) by 200 days.

(21) Appl. No.: 12/223,985

(22) PCT Filed: Feb. 16, 2006

(86) PCT No.: PCT/JP2006/302691
§ 371 (c)(1),
(2), (4) Date: Aug. 14, 2008

(87) PCT Pub. No.: WO2007/094062
PCT Pub. Date: Aug. 23, 2007

(65) Prior Publication Data
US 2010/0229521 A1    Sep. 16, 2010

(51) Int. Cl.
*D02G 3/02* (2006.01)
(52) U.S. Cl. ............... 57/204; 57/250; 57/258; 57/293
(58) Field of Classification Search ............... 57/1 UN, 57/204, 250, 258, 205, 293
See application file for complete search history.

(56) References Cited

U.S. PATENT DOCUMENTS

| 4,523,428 | A | * | 6/1985 | Negishi et al. ............. 57/288 |
| 4,728,387 | A | * | 3/1988 | Hilakos .................. 156/441 |
| 5,897,680 | A | * | 4/1999 | Geertman ................ 65/402 |
| 6,148,597 | A | * | 11/2000 | Cook ...................... 57/287 |
| 6,314,713 | B1 | * | 11/2001 | Fitz et al. ................ 57/293 |
| 6,828,023 | B2 | * | 12/2004 | Broome et al. .......... 428/378 |
| 7,165,735 | B2 | * | 1/2007 | Gilbos et al. ............. 242/178 |
| 7,207,167 | B2 | * | 4/2007 | Kim ...................... 57/2.3 |
| 2003/0024230 | A1 | * | 2/2003 | Knutson ................. 57/204 |
| 2005/0132692 | A1 | * | 6/2005 | Kim ...................... 57/7 |

FOREIGN PATENT DOCUMENTS

| JP | 4-63533 A | 2/1992 |
| JP | 4-335849 A | 11/1992 |
| JP | 6-178638 A | 6/1994 |
| JP | 11-103737 A | 4/1999 |
| JP | 2003-250407 A | 9/2003 |
| JP | 2006-129863 A | 5/2006 |

* cited by examiner

*Primary Examiner* — Shaun R Hurley
(74) *Attorney, Agent, or Firm* — Birch, Stewart, Kolasch & Birch, LLP

(57) ABSTRACT

The present application of the invention aims at improving knot strength of a twisted yarn without compromising circularity, with respect to various yarns including a fishing line. For such purpose, the present application of the invention provides a yarn including a multifilament subjected to two twisting processes in different directions, and a coating resin that covers a surface of the multifilament; wherein the multifilament is subjected to a first twist in one direction, and then to a second twist in a direction opposite to that of the first twist, without being doubled with another yarn.

18 Claims, 1 Drawing Sheet

MULTIFILAMENT AND METHOD FOR MANUFACTURING THE SAME, AND YARN AND METHOD FOR MANUFACTURING THE SAME

FIELD OF THE INVENTION

The present invention relates to a yarn and to a method of manufacturing the same.

DESCRIPTION OF THE BACKGROUND ART

Patent document 1: Publication No. 1999-103737 (Japanese Patent Application No. 1997-272978)

Characteristics required from, for example, a fishing line include light weight, high strength, and durability as these properties.

With regard to high strength, which a nylon monofilament lacks as a disadvantageous point of a conventionally used fishing line, various types of covered yarns formed by winding a sheath yarn around a core yarn have been proposed to satisfy the object of high strength.

For example, the fishing line according to patent document 1 has been proposed with an object to satisfy the high strength, without compromising production efficiency and abrasion resistance of the fishing line.

The fishing line is a covered yarn which adopts a synthetic fiber multifilament yarn as the core yarn, around which a twisted synthetic fiber multifilament yarn is wound as the sheath yarn, such that a difference between the angle defined by the core yarn and the sheath yarn and the twisting angle of the sheath yarn does not exceed 25°.

The cited invention claims, with such a structure, that it provides a fishing line having excellent mechanical characteristics such as high breaking strength, high knot strength, low breaking elongation, and also high abrasion resistance.

However, as a trade-off with the high strength attained with the multifilament (twisted yarn), the fishing line often spins and becomes tangled with the guide of the fishing rod, when fishing using the twisted yarn.

One of the present inventors (Yasuhisa Yamamoto) has created a new invention (Japanese Patent Application No. 2005-56927), with an object to solve the foregoing problem of the fishing line according to patent document 1, and further to improve the tensile strength thereof. The invention provides a fishing line including a plurality of multifilament yarns, and formed by ply-twisting the multifilament yarns such that a value obtained by dividing a value twice as large as the ratio of number of twists between a preliminary twist and a final twist, by the number of multifilament yarns to be twisted together becomes not less than 1.2 and not more than 2.5. Such an invention restricts the fishing line from spinning and thereby from becoming tangled with the guide of the fishing rod, thus significantly minimizing the trouble in use, when fishing with the fishing line made of the multifilament yarn (twisted yarn).

On the other hand, the present inventor has constantly studied, even after submitting the foregoing invention, on the possibility of further improvement in knot strength of the yarn.

The intended improvement in knot strength would provide enormous benefit not only to the fishing line but also to yarn products in general, such as the gut strings of a tennis racket, embroidery threads, sewing threads, ropes and yarns used as the core of a curl-cord strap for a mobile phone, as well as yarn used for manufacturing fishing nets and safety nets.

Regarding the fishing line in particular, although the knot strength can be improved, if the circularity is degraded (flattening ratio is increased), in other words if the cross-section of the fishing line becomes flattened, the fishing line unnaturally reflects light, thereby causing the fish to have a sense of caution. Also, the degradation in circularity may lead to degradation in tensile strength (gross knot strength), although the knot strength is improved. Further the degradation in circularity often provokes such line trouble as becoming tangled with the guide of the fishing rod, as described above.

DISCLOSURE OF THE INVENTION

In view of the foregoing problem, an object of the present invention is to improve the knot strength of the twisted yarn, through a drastic changeover on the concept thereof, without compromising the circularity of the yarn as a trade-off for an improvement in knot strength.

To achieve the foregoing object, a first aspect of the present invention provides the following yarn.

The yarn includes a multifilament subjected to two twisting processes in different directions, and a coating resin that covers a surface of the multifilament. The multifilament is subjected to a first twist in one direction, and then to a second twist in a direction opposite to that of the first twist, without being doubled with another yarn.

Here, the yarn herein referred to includes not only the yarn as a finished product, but also the yarn in a form of a semi-finished product. Examples of the semi-finished product include, for example, the yarn to be further coated with a resin for a specific purpose.

A second aspect of the present application of the invention provides the invention according to the first aspect, wherein the coating resin is either applied to a surface of the multifilament, or made to intrude among each single yarn constituting the multifilament, before the yarn is subjected to the first twist.

A third aspect of the present application of the invention provides the invention according to the first aspect, wherein the coating resin is applied to a surface of the multifilament, after the yarn is subjected to the first twist and before the yarn is subjected to the second twist.

A fourth aspect of the present application of the invention provides the following yarn according to any one of the first to the third aspects. The multifilament is predominantly composed of ultra-high polymer polyethylene or polyarylate; a ratio of the number of twists between the first twist and the second twist is not less than 1.05 and not more than 2.5; and the number of twists of the first twist is from 180 to 1000 T/M. Also, the coating resin is a thermoplastic resin, and a deposition amount of the coating resin is 15 to 50 wt. parts with respect to 100 wt. parts of the filament.

Here, T/M means the number of turns per meter. That is, the number of twists of the first twist is not less than 180 turns and not more than 1000 turns per meter.

Also, the ratio of the number of twists refers to the ratio of the number of twists of the first twist with respect to that of the second twist, being taken as 1.

A fifth aspect of the present application of the invention provides the yarn according to any one of the first to the fourth aspects, having a flattening ratio not less than 1 and not more than 1.25.

Here, the flattening ratio herein referred to means a ratio of the major axis of the circle representing the cross-sectional shape of the yarn, with respect to the minor axis, and the closer to 1 the ratio is, the higher the circularity is.

A sixth aspect of the present application of the invention provides a method of manufacturing a yarn, including coating a surface of a multifilament with a resin; applying a first twist to the multifilament in one direction, and applying a second twist in an opposite direction, without doubling the yarn with another yarn.

A seventh aspect of the present application of the invention provides a multifilament subjected to two twisting processes in different directions, including a coating resin that covers a surface thereof; wherein the multifilament is subjected to a first twist in one direction, and then to a second twist in a direction opposite to that of the first twist, without being doubled with another yarn.

An eighth aspect of the present application of the invention provides a method of manufacturing a multifilament, coating a surface of a filament with a resin; applying a first twist to the filament in one direction, and applying a second twist in an opposite direction, without doubling the filament with another yarn.

BEST MODE FOR CARRYING OUT THE INVENTION

Figure 1:
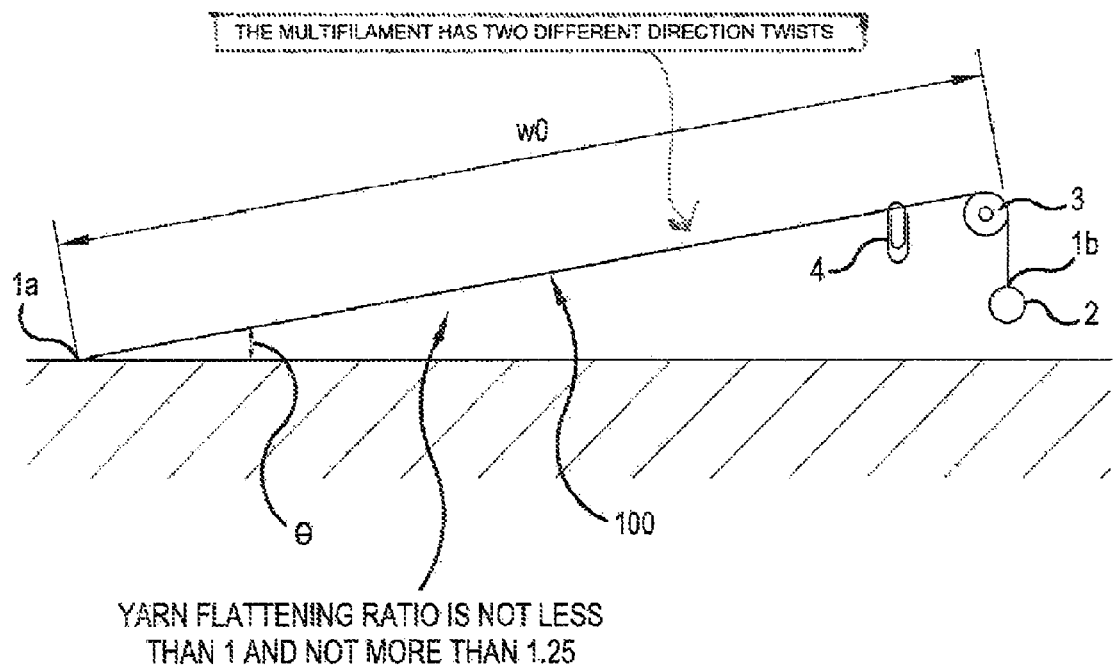
FIG. 1 is a schematic side view for explaining a measurement method of smoothness (speed) shown in Table 4.

Hereunder, preferred embodiments of the present invention will be described.

The present invention is applicable to yarn products in general, such as the gut strings of a tennis racket, embroidery threads, sewing threads, ropes, a yarn used as the core of a curl-cord strap for a mobile phone (fishing nets, safety nets). The yarn according to the present invention is especially suitable for a fishing line.

The known spinning techniques include a ply-twisting (two-stage twisting) process, consisting of twisting one or a plurality of yarns put together (preliminary twist), and twisting two or more of such twisted yarns put together (final twist) (The ply-twisted yarn means the yarn made by twisting two or more yarns put together in a direction opposite to that of the preliminary twist, according to a definition of JIS (Japanese Industrial Standards)).

As stated earlier, the invention of the present application has been achieved through a drastic changeover of the conventional concept of the foregoing ply-twisted yarn, and proposes applying a two twisting process, that is, the first twist (hereinafter, preliminary twist) and the second twist (hereinafter, final twist) in the opposite direction, to a multifilament (hereinafter simply filament, as the case may be) using a resin as stated above, instead of two or more yarns (in the description of the present invention, the preliminary twist refers to a twist first applied to the filament, and the final twist a twist subsequently applied to the filament in a direction opposite to that of the preliminary twist).

The filament is coated with a thermoplastic resin, at least before being subjected to the final twist. This is because the uncured resin is expected, at least during the final twist process in the manufacturing process, to provide the same effect as that obtained by applying both the preliminary twist and the final twist. Another reason is that reversion of the twist can be suppressed.

Setting the ratio for the number of twists between the final twist and the preliminary twist to be not less than 1.05 and not more than 2.5 and the number of twists of the final twist at 180 to 1000 T/M means applying the preliminary twist and the final twist in such ranges at the twisting process in the manufacturing process (not the respective number of twists and the ratio thereof of the finished yarn).

It is difficult to confirm the state of the filament after finishing since the filament is coated with the resin, however, applying the final twist after the preliminary twist causes a twist reversing effect, and hence the number of twists and the ratio thereof of the finished yarn are often different from the foregoing values. Despite the twist reversing occurring, however, applying the respective twists as specified above leads to significant improvement in knot strength.

Also, although a single twisting process might be simply adopted in consideration of the twist reversing, in the case of the single twist the yarn becomes flattened and, though similar knot strength may be secured, the yarn circularity (flattening ratio) specified above cannot be obtained. Thus, even though the final twist causes the twist reversing of the same number of twists against the preliminary twist (the twist reversing corresponding to 100% of the number of twists of the final twist), higher circularity (lower flattening ratio) can be secured in comparison with the case where the final twist is not applied at all, i.e. simply applying the single twist.

It is possible to adopt a thermoplastic resin as the coating resin. Examples of the thermoplastic resin include polyethylene (PE), polypropylene (PP), polystyrene (PS), an acrylonitrile styrene resin (AS), an acrylonitrile butadiene styrene resin (ABS), a metacrylate resin (PMMA), polyvinylchloride (PVC), polyamide (PA), polyacetal (POM), polybutylene terephthalate (PBT), polyethylene terephthalate (PET), polymethylpentene (TPX), polycarbonate (PC), and polytetrafluoroethylene (PTFE). It is possible to adopt what is generally called a synthetic resin adhesive, as the coating resin.

It is especially preferable to adopt as the coating resin, a resin predominantly composed of one of a urethane resin (especially polyurethane resin), a polyester resin, an acrylic resin, a chlorinated polypropylene resin, a styrene resin, a fluorine-based resin, and soft PVC (polyvinylchloride).

Hereunder, a first to a fourth preferred manufacturing method of the foregoing yarn will be sequentially described.

To start with, the first manufacturing method includes a coating process, a preliminary twist process, a final twist process, and a drying process to be performed in this order.

In the coating process, a resin is applied to a known multifilament made from ultra-high polymer polyethylene or polyarylate. Specifically, the resin is applied to the surface of the multifilament and made to intrude among each single yarn constituting the multifilament, to thereby coat the single yarns with the resin. In the preliminary twist process, the resin-coated multifilament is twisted (preliminary twist) before the resin is completely cured. Specifically, the coated filament is twisted in one direction by a known method. After the twisting process in the one direction, the multifilament is immediately (before the coating resin is completely cured) twisted in the final twist process, in a direction opposite to the one direction. After applying the twist in the opposite direction, the filament is subjected to the drying process, for baking the filament so as to dry the resin. It is preferable to perform a surface treatment process between the final twist process and the drying process, i.e. after applying the opposite twist and before the baking. The surface treatment means a smoothening process for the surface of the filament.

The first manufacturing method will be described in further detail.

As the raw yarn, the multifilament made from ultra-high polymer polyethylene or polyarylate is adopted, as stated above.

In the coating process, the polyester resin is adopted as the coating resin and a dip-coating process (soaking the yarn in the resin) is performed so as to coat the multifilament, the raw yarn, with the coating resin. A commercially available polyester resin may be adopted. For example, a polyester resin containing 60 to 55 wt. parts of polyester and 40 to 45 wt. parts of styrene (total 100 wt. parts) may be adopted. Regarding the coating resin, a resin solution containing 70 wt. parts of the polyester resin and 30 wt. parts of solvent (total 100 wt. parts) may be used. Suitable solvents include the one containing toluene, isopropyl alcohol, and ethylacetate. It is especially preferable to prepare a coating resin solution containing 100 wt. parts of the resin solution (polyester resin+ solvent) and 3 wt. parts of glycerin (total 103 wt. parts), and to perform the dip-coating of the multifilament in such coating resin solution.

To perform the dip-coating, a roller may be arranged at a liquid surface level on a resin tank containing the coating resin, so as to completely immerse the filament in the resin by means of the roller.

In the coating process, the resin is applied to the filament such that the deposition amount of the coating resin becomes 15 to 50 wt. parts with respect to 100 wt. parts of the filament, after the drying process to remove the solvent component or water, as will be described later. In the case where the resin deposition amount after completing the yarn (after the drying process) is less than 15 wt. parts specified above, the adhesion performance is poor and the single yarns are separated. This is especially disadvantageous in the case where the filament is used as a fishing line. On the other hand, in the case where the resin deposition amount after completing the yarn (after the drying process) is more than 50 wt. parts specified above, the economic efficiency is degraded (production cost is increased), and the characteristics of the filament material such as flexibility and abrasion resistance cannot be exhibited. It is especially preferable to set the resin deposition amount after the drying process in a range of 20 to 40% in weight, with respect to the weight of the coating resin solution before the coating process (the weight of the yarn after coating and drying becomes 100 to 200% with respect to the weight before coating).

Then in the preliminary twist process, a known apparatus (twisting machine) is used to apply the preliminary twist to the filament coated with the resin as above, before the coating resin is cured.

In the preliminary twist process, the filament is twisted at a rate of 180 to 1000 T/M. In the case where the number of twists exceeds 1000 T/M, the elasticity significantly declines, thereby creating problems. More specifically, yarn break occurs at the time of processing the twisted yarn, which leads to degraded properties after the processing. In the case where the number of twists is less than 180 T/M, the yarn may return to a state of simply being extended together, and the single yarns may break from each other. The number of preliminary twists of not less than 180 T/M eliminates the problem of the single yarn separation in practical use, however in order to further ensure the elimination of the problem of the single yarn separation, it is preferable to set the number of preliminary twists at 450 T/M or more.

After the preliminary twist and before the resin is cured, the final twist process is performed so as to twist the multifilament in a direction opposite to that of the preliminary twist.

For example, in the case where S-twist is applied in the preliminary twist process, Z-twist is applied in the final twist process. On the contrary, in the case where the Z-twist is applied in the preliminary twist process, the S-twist is applied in the final twist process.

Specifically, in the final twist process the opposite twist to that of the preliminary twist is applied, at a rate of not less than 150 T/M. In the process, the final twist is applied such that the ratio of the number of twists between the preliminary twist and the final twist (the number of preliminary twists with respect to the number of final twists taken as 1) becomes not less than 1.05 and not more than 2.5. In the case where the ratio of the number of twists is less than 1.05, or where on the contrary the ratio is more than 2.5, upon horizontally extending the filament cut in 1 meter holding the respective ends thereof and bringing the ends closer such that the center of the filament sags downward, although knot strength is improved, the filament rotates more than once (more than 360 degrees) in either case. Using such a filament as a fishing line often results in line trouble such as becoming tangled with the guide of the fishing rod, and is not durable for a practical use. As already stated, the ratio of the number of twists between the preliminary twist and the final twist is to be adjusted in the manufacturing process, and not intended for the finished product (this also applies to a second to a fourth manufacturing method).

Figure 1A:
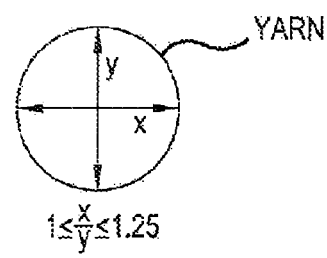
FIG. 1a is a cross-sectional view of a yarn having a flattening ratio not less than 1 and not more than 1.25

Applying both of the preliminary twist and the final twist allows obtaining the filament having a flattening ratio of not less than 1 and not more than 1.25, as shown, for example, in FIG. 1a.

In the surface treatment process, a finishing agent is applied to the surface of the filament, so as to smoothen the surface thereof. It is preferable to adopt the finishing agent prepared by dissolving oil in a solvent of the equivalent quantity. Also, it is preferable to adopt the dip-coating process for the application of the finishing agent in the surface treatment process.

In the case where an excessive amount of resin is deposited, the solvent may be utilized to remove the excess of the resin to thereby adjust the resin amount, before applying the finishing agent in the surface treatment process.

In the drying process, the resin is baked by dry heat of 80° C. to 330° C. In the case where the foregoing resin and the finishing agent are adopted in particular, it is preferable to perform the baking with dry heat of 270° C. Also, instead of such dry heating process (baking the coating resin), for example, hot air may be used for the drying process.

As stated above, after the drying process the solvent (liquid component) is entirely removed by the baking in the drying process, and only the solid content (polyester) is deposited on the filament.

The finished yarn which has undergone the respective processes described above is passed through a known take-up machine and wound by a winding machine.

The foregoing processes are all performed at room temperature, except the drying process. Although the polyester resin is used as the coating resin in the foregoing description, a polyurethane resin or an acrylic resin may be adopted instead.

A second manufacturing method will now be described. This method includes a coating process, a preliminary twist process, a resin addition process, a final twist process, and a drying process to be performed in this order.

As in the foregoing method, first, a resin is applied for coating, to a known multifilament (raw yarn) made from ultra-high polymer polyethylene or polyarylate, in the coating process. In the preliminary twist process, the resin-coated multifilament is twisted in one direction (preliminary twist) before the resin is completely cured. Here, unlike the first method, the resin addition process is performed so as to further apply a resin to the filament surface for coating, after the preliminary twist and before the final twist. Then the filament is twisted in a direction opposite to the one direction (final twist), in the final twist process. The filament is then subjected to the drying process, for baking so as to dry, the resin. In this method, it is preferable to perform a surface treatment process and a secondary drying process, after the drying process. The surface treatment process is performed in a similar manner to the surface treatment process of the first manufacturing method. In the secondary drying process, the filament after being subjected to the surface treatment is baked, for drying the resin.

The second manufacturing method will be described in further detail.

As the raw yarn, a multifilament made from ultra-high polymer polyethylene or polyarylate is adopted, as in the first manufacturing method.

In the coating process, the known multifilament (raw yarn) made from ultra-high polymer polyethylene or polyarylate is coated with a urethane resin through the dip-coating process, as in the first manufacturing method. A commercially available urethane resin may be adopted. For example, a commercially available polyurethane resin containing 70 to 45 wt. parts of polyurethane and 30 to 55 wt. parts of solvent (total 100 wt. parts) may be used.

The resin solution to be used for coating in the above-process may be prepared as 100 wt. parts of the polyurethane resin and 10 wt. parts of solvent (total 110 wt. parts).

Regarding the resin deposition amount, the resin solution is to be applied in the coating process to the filament that has undergone the preliminary twist, such that 10 to 20 wt. parts of coating resin (solid content) is deposited with respect to 100 wt. parts of filament, under the state that the solvent component has been removed, after completion of the drying process (in the case of performing the secondary drying process, after completion thereof).

In the preliminary twist process, the preliminary twist is applied to the resin-coated multifilament, before the resin applied in the coating process is completely cured. Specifically, the coated filament is twisted by a known method in one direction. In the preliminary twist process of the second manufacturing method also, the preliminary twist is performed under a similar condition to that of the first manufacturing method. Specifically, the number of twists of the preliminary twist is set in a range of 180 to 1000 T/M.

The filament thus subjected to the preliminary twist process, a resin is further applied in the resin addition process. In the resin addition process, modified polypropylene such as a commercially available PP primer (hereinafter, HV) may be adopted as the coating resin. For example, an HV resin containing 30 wt. parts of chlorinated polypropylene and 70 wt. parts of toluene (total 100 wt. parts) may be adopted.

In the resin addition process, a resin solution containing 50 wt. parts of HV and 50 wt. parts of solvent (total 100 wt. parts) may be used for coating. The filament is subjected to another dip-coating process in the thus prepared resin solution, as stated above. Regarding the resin deposition amount in the resin addition process, the resin solution is to be applied such that 10 to 20 wt. parts of resin (solid content) is deposited with respect to 100 wt. parts of raw yarn (filament before the coating process) so as to coat the filament, after the drying process (in the case of performing the secondary drying process, thereafter), i.e. under the state that the solvent component has been removed.

Accordingly, the filament that has undergone the subsequent drying process or the secondary drying process carries 20 to 40 wt. parts of resin with respect to 100 wt. parts of raw yarn, as the total of the resin applied in the coating process and the resin applied in the resin addition process (the finished filament becomes 120 to 140 wt. parts as a whole).

The filament further coated in the resin addition process is subjected to the final twist process, in a direction opposite to that of the preliminary twist.

The final twist of the second manufacturing method is also performed under a similar condition to that of the first manufacturing method. Specifically, the ratio of the number of twists between the preliminary twist and the final twist is set to be not less than 1.05 and not more than 2.5, and the number of the final twists is set to be 150 T/M or more.

Then in the drying process, as in the first manufacturing method, the dry heating process is performed so as to bake the resin provided over the filament. It is preferable to perform this process with dry heat of 110° C. to 220° C., and more preferably with dry heat of 120° C. to 200° C. Especially, it is preferable to bake with the dry heat of 180° C.

The surface treatment process is to be performed in a similar manner to the first manufacturing method. Specifically, a finishing agent is applied to the filament surface through the dip-coating process.

After the surface treatment process, it is preferable to further bake the filament after the surface treatment, in the secondary drying process, thus to finish the yarn. In the secondary drying process, it is preferable to perform the dry heating process for baking, at 110° C. to 220° C., and more preferably at 120° C. to 200° C. Especially, it is preferable to bake with the dry heat of 150° C.

Through the drying process and the secondary drying process, the solvent of the resin is removed, so that the filament is coated with the solid content of the resin corresponding to 20 to 40 wt. % of the raw yarn, as stated above.

Further, a third manufacturing method will be described. This method includes a coating process, a preliminary twist process, a resin addition process, a final twist process, a secondary resin addition process, and a drying process, to be performed in this order.

Each process in the coating process through the final twist process in this manufacturing method is similar to those of the second manufacturing method. The secondary resin addition process is performed to further apply a resin to the filament after the final twist process. In the drying process performed after the secondary resin addition process, the dry heating process is performed so as to bake the resin, as in the first and the second manufacturing method.

The third manufacturing method will be described in further detail.

As the raw yarn, a multifilament made from ultra-high polymer polyethylene or polyarylate is adopted, as in the first manufacturing method.

In the coating process of the third manufacturing method, the multifilament (raw yarn) is coated with an HV resin. For the coating, a resin solution composed of 90 wt. parts of HV resin and 10 wt. parts of polyester resin is adopted, and the dip-coating process is performed in a coating resin solution containing 50 wt. parts of such resin solution (HV+polyester resin) and 50 wt. parts of solvent (total 100 wt. parts).

Regarding the resin deposition amount through this coating process, the resin is to be applied such that 10 to 20 wt. parts of the resin solid content is deposited with respect to 100 wt. parts of filament (raw yarn), after the drying process.

After the coating process, the preliminary twist process is performed. The number of preliminary twists according to the third manufacturing method is also the same as that of the first manufacturing method.

After the preliminary twist process, the resin addition process is performed so as to further coat the filament subjected to the preliminary twist, with a resin. In the resin addition process of the third manufacturing method, the dip-coating process is performed in the coating resin solution prepared as above (the same component and mixing ratio) according to the third manufacturing method. The deposition amount is al-so to be the same as above.

Regarding the resin deposition amount in this resin addition process, the resin is to be applied such that 10 to 20 wt. parts of the resin solid content is deposited with respect to 100 wt. parts of filament (raw yarn), after the drying process.

After the resin addition process, the final twist process is performed. In the final twist process of the third manufacturing method, the number of final twists, as well as the ratio of the number of twists between the preliminary twist and the final twist are set in the same way as in the first manufacturing method.

After the final twist process, the secondary resin addition process is performed. In this resin addition process, a commercially available HV resin may be used. The filament is added with such HV for example, through the dip-coating process. In the secondary resin addition process, the HV may be used without adjusting the component thereof.

In the secondary resin addition process, the deposition amount of the coating resin may be set to be 10 to 20 wt. parts with respect to 100 wt. parts of raw yarn, after the subsequent drying process. However, it is preferable that the total weight ratio of the resin applied to the filament through the coating process, the resin addition process and the secondary resin addition process of the third manufacturing method does not exceed 20 to 40 wt. parts in solid content with respect to 100 wt. parts of raw yarn, after the drying process. As already stated, an excessive resin deposition amount leads to degraded economic efficiency and properties of the filament material such as elasticity and abrasion resistance, and an insufficient resin amount leads to poor adhesion performance, thereby causing the separation of the single yarns.

After the secondary resin addition process, the drying process is performed. In the drying process, the dry heating process is performed so as to bake the resin covering the filament. It is preferable to adopted the dry heat of 110° C. to 220° C., and more preferably 120° C. to 200° C. Especially, it is preferable to bake with the dry heat of 150° C.

Next, a fourth manufacturing method will be described. The fourth method includes a preliminary twist process, a coating process, a final twist process, a resin addition process, and a drying process to be performed in this order.

In the preliminary twist process, a multifilament raw yarn made from ultra-high polymer polyethylene or polyarylate is subjected to twisting in one direction (preliminary twist), before being coated with a resin. After the preliminary twist, the coating process is performed so as to coat the surface of the multifilament with a resin. After the resin coating, the filament subjected to the preliminary twist process is twisted in a direction opposite to that of the preliminary twist process, in the final twist process. Then in the resin addition process, the filament is further coated with a resin.

Here, after the drying process, it is preferable to perform the surface treatment process and the secondary drying process.

The surface treatment process is similar to that of the first and the second manufacturing method. Likewise, the secondary drying process is similar to the drying process of the fourth manufacturing method.

The fourth manufacturing method will be described in further detail.

As the raw yarn, a multifilament made from ultra-high polymer polyethylene or polyarylate is adopted, as in the first manufacturing method.

In this preliminary twist process also, conventionally known equipment is adopted to apply the preliminary twist to the raw yarn, in the same number of twists as in the preliminary twist process of the first manufacturing method. Then in the coating process the filament subjected to the preliminary twist is coated with a urethane resin. A commercially available polyurethane resin may be adopted in this process.

In this process, resin solution containing 50 wt. parts of polyurethane resin and 50 wt. parts of ester (total 100 wt. parts) is used, and the coating resin solution is composed of 100 wt. parts of such resin solution (polyurethane resin+ester) and 10 wt. parts of glycerin (total 110 wt. parts), in which the filament subjected to the preliminary twist is dip-coated. The resin deposition amount is to be set such that 10 to 20 wt. parts of resin (solid content) is deposited with respect to 100 wt. parts of raw yarn, after the drying process (in the case of performing the secondary drying process, thereafter).

Then in the final twist process, the final twist is applied in a direction opposite to that of the preliminary twist. The number of final twists as well as the ratio of the number of twists between the preliminary twist and the final twist are similar to those specified in the first manufacturing method.

After the final twist process, the filament is further coated with a resin, in the resin addition process. In this process, a resin solution containing 30 wt. parts of urethane resin and 70 wt. parts of acrylic resin (total 100 wt. parts) is adopted, to be added to the filament by dip-coating. As the urethane resin, a commercially available polyurethane resin may be adopted. For example, a resin solution containing 70 to 45 wt. parts of urethane resin and 30 to 55 wt. parts of solvent (total 100 wt. parts) may be adopted. Regarding the acrylic resin also, a commercially available one may be adopted. The resin of this type may be prepared in a composition of 60 to 40 wt. parts of acrylic resin and 40 to 60 wt. parts of solvent (total 100 wt. parts).

The deposition amount of the foregoing resin (urethane resin+acrylic resin) is to be set as 10 to 20 wt. parts of resin (solid content) with respect to 100 wt. parts of raw yarn, after the drying process (in the case of performing the secondary drying process, thereafter).

Accordingly, after the solvent is removed through the subsequent drying process, the total amount of the resin deposited in the coating process and that deposited in the resin addition process becomes 20 to 40 wt. parts with respect to 100 wt. parts of raw yarn (the total weight of the filament after application of the resin becomes 120 to 140 wt. parts).

After the resin addition process, the drying process is performed, so as to bake the resin covering the filament with dry heat of 110° C. to 220° C. More preferably, the dry heat of 120° C. to 220° C. may be adopted, and it is most preferable to bake with the dry heat of 180° C.

After the drying process, the surface treatment process is performed. In this surface treatment process, the same process as the surface treatment process of the first and the second manufacturing method is to be performed.

After the surface treatment process, another drying process is performed through the secondary drying process. In this secondary drying process also, dry heat of 100° C. to 220° C. is adopted so as to bake the resin. More preferably, the dry heat of 120° C. to 220° C. is to be adopted for the baking, and especially it is most preferable to bake with the dry heat of 150° C.

The first to the fourth manufacturing method described above enable manufacturing the yarn according to the present invention. In particular, adopting the first to the fourth manufacturing method enables providing yarn subjected to the preliminary twist of not less than 500 turns and not more than 1000 turns per meter, and having tensile strength of 27 g/d or more, tensile elongation of 7% or less, knot strength of 11 g/d or more, knot elongation of 2.7% or less, and a flattening ratio of 1 to 1.17.

Further, in the first to the fourth manufacturing method, it suffices that the solid content of the resin covering the filament is within the respective foregoing ranges of the deposition amount after the drying process (or after the secondary drying process), and each of the mixing ratios of the resin and the solvent to be applied to the filament specified in the first to the fourth manufacturing method may be modified to a different ratio.

In the first to the fourth manufacturing method, as stated above, it is preferable to adopt a coating resin predominantly composed of one of a urethane resin (especially, polyurethane resin), a polyester resin, an acrylic resin, a chlorinated polypropylene resin, a styrene resin, a fluorine-based resin, and soft PVC (polyvinylchloride).

Also, the urethane resin includes a polyurethane resin emulsion. The styrene resin includes a styrene/acrylic emulsion. The styrene/acrylic emulsion containing 45 wt. % of solid content (total 100 wt. %) may be adopted.

Examples of the finishing agent may adopt a commercially available oil such as a silicone resin, other types of silicone oil, liquid paraffin, and other mineral oil and vegetable oil.

In the foregoing description, although the polyester resin is adopted as the coating resin in the first manufacturing method, the polyurethane resin, the acrylic resin, the chlorinated polypropylene resin, the styrene resin, the fluorine-based resin, and the soft PVC (polyvinylchloride) cited above may be adopted instead of the polyester resin, in the first manufacturing method.

In the second manufacturing method, although the urethane resin is adopted in the coating process and the chlorinated polypropylene resin (HV) is adopted in the resin addition process, the polyester resin, the acrylic resin, the styrene resin, the fluorine-based resin, and the soft. PVC (polyvinylchloride) cited above may be adopted instead of the urethane resin and the chlorinated polypropylene resin, in the second manufacturing method. In the case of adopting the urethane resin also, for example, the polyurethane resin emulsion may be adopted, and the polyurethane resin emulsion containing, for example, 39 wt. % of solid content (total 100 wt. %) may be adopted.

In the third manufacturing method, although the resin predominantly composed of the chlorinated polypropylene resin (HV+polyester) is adopted in the coating process, and the chlorinated polypropylene resin (HV) is further adopted in the resin addition process and in the secondary resin addition process, the urethane resin, the polyester resin, the acrylic resin, the styrene resin, the fluorine-based resin, and the soft PVC (polyvinylchloride) cited above may be adopted instead of those resins, in the third manufacturing method.

Further, in the fourth manufacturing method, although the urethane resin is adopted in the coating process and the urethane resin and the acrylic resin are adopted in the resin addition process, the polyester resin, chlorinated polypropylene resin, the styrene resin, the fluorine-based resin, and the soft PVC (polyvinylchloride) cited above may be adopted instead of those resins.

In the respective foregoing manufacturing methods, the ultra-high polymer polyethylene multifilament can be exemplified by Dyneema SK60 (Dyneema: registered trademark), and the polyarylate multifilament can be exemplified by Vectran HT220 40 (Vectran: registered trademark).

Also, in the respective foregoing manufacturing methods, the coating resin to be adopted in the coating process can be exemplified by the following.

Specifically, FH-123 (trade name/from Solar Co., Ltd.) may be adopted as the polyester resin, and Narucoat JW PE301 (trade name/from Naruse Kagaku Kabushiki Kaisha) as the polyethylene resin. Also, the polyurethane resin can be exemplified by Hydran AP-60 (Hydran: registered trademark), Hydran HW-140 (Hydran: registered trademark), High-resin PU-9500 (trade name/from Takamatsu Oil & Fat Co., Ltd.), Neosticker 700 (Neosticker: registered trademark), Permalyn UA-310 (Permalyn: registered trademark), Nippolan 5210 (Nippolan: registered trademark), and Polyurex sanding sealer X-222E (trade name/from Washin Chemical Industry Co., Ltd.). As the modified polypropylene resin (chlorinated polypropylene resin), PP Coat HV (trade name/from Kuboko Paint Co., Ltd.) may be adopted. As the acrylic urethane resin, Polyauto Clear (trade name/from Kuboko Paint Co., Ltd.) may be adopted.

As the acrylic resin, water-soluble Tsuyadashi-Nisu (trade name/from Washin Paint Co., Ltd.) may be adopted.

Dye Reducer PA No. 20 (Dye Reducer: registered trademark) may be adopted as the solvent for the polyurethane resin, as well as for the polyester resin.

Also, for example, a resin solution composed of PP Coat HV and Dye Reducer PA No. 20 as the solvent may be adopted as the HV resin solution for the resin addition process. As the HV resin for the secondary resin addition process, PP Coat HV may be adopted.

As the finishing agent, it is preferable to adopt a silicon resin (silicon-based surface treatment agent). As the solvent for such finishing agent, xylene may be adopted. Other examples of the finishing agent include silicone oil, liquid paraffin, silicone rubber, mineral oil and vegetable oil. The Dye Reducer PA No. 20 may also be utilized to remove an excess of the resin before applying the finishing agent. Other examples of the solvent may adopt toluene, isopropylalcohol, and ethyl acetate.

Also, the polyurethane resin emulsion can be exemplified by Permalyn UA-310 (trade name/from Sanyo Chemical Industries, Ltd.).

As the styrene/acrylic emulsion, an example of the styrene resin, Mowinyl 975N (trade name/from Nichigo-Mowinyl Co., Ltd.) may be adopted.

As the polyethylene resin emulsion, Narucoat JW PE301 (trade name/from Naruse Kagaku Kabushiki Kaisha) may be adopted. Also; as a hot-melt polyamide emulsion (polyamide copolymer), Grirltex 1500A (trade name/from EMS) may be adopted. The soft PVC may be an ethylene acrylic acid copolymer sodium salt (ethylene acrylic acid copolymer neutralized salt), which can be exemplified by Zaikthene-N (registered trademark/from Sumitomo Seika Chemicals Co., Ltd.).

It is stated above that, in the drying process of the first manufacturing method for example, dry heat of 80° C. to 330° C. is to be applied for baking the resin, and that, in the drying process of the second manufacturing method, dry heat of 110° C. to 220° C., and more preferably 120° C. to 200° C., is appropriate. More specifically, on this point, in the case of using Dyneema SK60 as the ultra-high polymer polyethylene multifilament, the melting point is 120° C. to 130° C., and hence it is preferable to apply dry heat of 90° C. to 150° C. for baking in the drying process of the respective manufacturing methods, and in the case of using Vectran HT220 40 as the polyarylate multifilament, the melting point is higher than 200° C. and hence it is preferable to apply dry heat of 90° C. to 330° C. for baking, in the drying process of the respective manufacturing methods.

Further, in the first manufacturing method, Narucoat JW PE301 is cited as the polyethylene resin emulsion. In the case of adopting the emulsion type polyethylene resin including the Narucoat JW PE301, it is preferable to perform a temporary baking process after the preliminary twist process and before the final twist process, in order to enhance the adhesion performance. In the temporary baking process, the filament coated with the resin and then subjected to the preliminary twist is exposed to dry heat of 65° C. to 95° C., so as to bake the coating resin. In the temporary baking process, it is preferable to apply dry heat of 70° C. to 90° C., and more preferably 80° C., to bake the resin. On the other hand, if a non-emulsion type polyethylene resin is adopted, the temporary baking process is not performed.

EXAMPLES

Hereunder, examples and comparative examples of the present invention will be described. The following yarns are all fishing lines.

TABLE 1

| | DENIER | TWIST PRELIMINARY | TWIST FINAL | TWIST RATIO | GROSS TENSILE STRENGTH GROSS STRENGTH kg | GROSS TENSILE STRENGTH STRENGTH g/d | TENSILE ELONGATION % | GROSS KNOT STRENGTH GROSS STRENGTH kg | GROSS KNOT STRENGTH STRENGTH g/d | KNOT ELONGATION % | ROTATION | CIRCULARITY | EVALUATION |
|---|---|---|---|---|---|---|---|---|---|---|---|---|---|
| YARN 1 | 400 | 855 | 726 | 1.18 | 11.83 | 29.58 | 6.14 | 5.75 | 14.38 | 2.60 | ○ | 1.15 | ○ |
| YARN 2 | 400 | 726 | 619 | 1.17 | 12.09 | 30.23 | 5.21 | 5.63 | 14.08 | 2.47 | ○ | 1.08 | ○ |
| YARN 3 | 300 | 855 | 726 | 1.18 | 8.63 | 28.77 | 5.18 | | | | | | |
| YARN 4 | 250 | 855 | 726 | 1.18 | 7.09 | 28.35 | 5.27 | | | | | | |
| YARN 5 | 200 | 855 | 726 | 1.18 | 6.12 | 30.60 | 5.05 | | | | | | |
| YARN 6 | 150 | 855 | 726 | 1.18 | 4.65 | 31.00 | 5.05 | | | | | | |
| YARN 7 | 400 | 938 | 790 | 1.19 | 10.21 | 25.53 | 4.97 | | | | | | |
| YARN 8 | 400 | 176 | 148 | 1.19 | 11.52 | 28.80 | 5.21 | | | | | | |
| YARN 9 | 400 | 726 | 280 | 2.59 | 11.43 | 28.58 | 4.76 | | | | | | |
| YARN 10 | 400 | 726 | 715 | 1.02 | 11.02 | 27.55 | 4.89 | | | | | | |
| YARN 11 | 400 | 1018 | | | | | | | | | | | |
| YARN 12 | 400 | 855 | 726 | 1.18 | 11.49 | 28.73 | 4.06 | | | | | | |
| YARN 13 | 400 | 176 | 148 | 1.19 | 11.26 | 28.15 | 4.21 | | | | | | |
| YARN 14 | 400 | 726 | 280 | 2.59 | 11.03 | 27.58 | 4.12 | | | | | | |
| YARN 15 | 400 | 726 | 715 | 1.02 | 11.54 | 28.85 | 4.08 | | | | | | |
| YARN 16 | 400 | 1018 | | | | | | | | | | | |
| YARN 17 | 250 | 726 | 507 | 1.43 | 6.95 | 27.80 | 3.57 | | | | | | |
| YARN 18 | 250 | 726 | 507 | 1.43 | 7.39 | 29.56 | 3.51 | | | | | | |
| YARN 19 | 250 | 726 | 507 | 1.43 | 7.24 | 28.96 | 3.48 | | | | | | |

TABLE 1-continued

| | | | | | | |
|---|---|---|---|---|---|---|
| YARN 3 | 4.06 | 13.53 | 2.35 | ○ | 1.11 | ○ |
| YARN 4 | 2.97 | 11.88 | 2.47 | ○ | 1.09 | ○ |
| YARN 5 | 2.91 | 14.54 | 2.26 | ○ | 1.12 | ○ |
| YARN 6 | 2.50 | 16.65 | 2.35 | ○ | 1.10 | ○ |
| YARN 7 | 4.56 | 11.40 | 1.79 | ○ | 1.09 | ○ |
| YARN 8 | 5.32 | 13.30 | 2.41 | ○ | 1.29 | x |
| YARN 9 | 5.58 | 13.95 | 1.81 | x | 1.20 | x |
| YARN 10 | 4.69 | 11.73 | 1.77 | x | 1.24 | x |
| YARN 11 | | | | | | x |
| YARN 12 | 4.88 | 12.20 | 1.73 | ○ | 1.13 | ○ |
| YARN 13 | 4.74 | 11.85 | 1.75 | ○ | 1.26 | x |
| YARN 14 | 4.96 | 12.40 | 1.77 | x | 1.21 | x |
| YARN 15 | 3.90 | 9.75 | 1.91 | x | 1.25 | x |
| YARN 16 | | | | | | x |
| YARN 17 | 3.43 | 13.72 | 1.92 | ○ | 1.06 | ○ |
| YARN 18 | 3.87 | 15.48 | 2.01 | ○ | 1.07 | ○ |
| YARN 19 | 3.90 | 15.60 | 1.98 | ○ | 1.06 | ○ |

Table 1 shows the data of 19 yarns, the yarn 1 to yarn 19.

In the tests shown in Table 1, gross tensile strength, tensile elongation, gross knot strength and knot elongation were measured according to JIS L 1013-1981.

More specifically, regarding the gross tensile strength, the tensile elongation, and the tensile strength, Shimadzu Autograph S-500D, which is a kind of Instron-type testing equipment, was used to measure a stress, upon imposing a load of a predetermined tensile strength on each filament, the stress until the filament broke, and the load at the breaking point was taken as the gross tensile strength (kg), the elongation at this point as the tensile elongation (%), and the value obtained by dividing the load at the breaking point by the cross-sectional area (d: denier) was taken as the tensile strength (g/d).

Regarding the gross knot strength, the knot elongation, and the knot strength, each fishing line was tightly tied in a square knot, and Shimadzu Autograph S-500D was used as above to impose a load at a predetermined tensile speed, and the load at the breaking point was taken as the gross knot strength (kg), the elongation at this point as the knot elongation (%), and the value obtained by dividing the load at the breaking point by the cross-sectional area was taken as the knot strength (g/d).

The rotation in Table 1 was evaluated based on whether the yarn rotated once or more, i.e. 360 degrees or more, upon horizontally extending the yarn cut at 1 meter holding the respective ends thereof and bringing the ends closer such that the center of the filament sags downward. Thus, a cross is given to those yarns that rotated once or more, and a circle to those that rotated less than once.

In addition to whether the yarn rotated, a thickness gauge was used to check whether the flattening ratio is not less than 1 and not more than 1.25, and further visual evaluation was performed to decide whether the single yarn separation and yarn break occurred, and a circle is given to those yarns that satisfied all such conditions, and a cross to those that failed to satisfy them.

The yarns 1 to 11 were each processed from a raw yarn made from ultra-high polymer polyethylene. The yarns 12 to 19 were each processed from a raw yarn made from polyarylate. As the ultra-high polymer polyethylene multifilament, Dyneema was adopted. As the polyarylate multifilament, Vectran was adopted.

The yarns 1, 2, 7, and 12, also the yarns 8 to 11 and the yarns 13 to 16 were processed from the raw yarn of 400 deniers; the yarn 3 from the raw yarn of 300 deniers; the yarn 4 from the raw yarn of 250 deniers; the yarn 5 from the raw yarn of 200 deniers; the yarn 6 from the raw yarn of 150 deniers; and the yarns 17 to 19 from the raw yarn of 250 deniers.

The yarns 1 to 16 were manufactured through the third manufacturing method, such that a resin solution composed of 90 wt. parts of PP Coat HV (HV) and 10 wt. parts of FH-123 (polyester resin) (total 100 wt. parts) was used in the coating process, and the dip-coating process was performed in a coating resin solution composed of 50 wt. parts of the resin solution (HV+polyester resin) and 50 wt. parts of Dye Reducer PA No. 20 (solvent) (total 100 wt. parts). In the resin addition process also, the same coating resin solution as above was used for the dip-coating. Further, in the secondary resin addition process, only PP Coat HV (HV) was used for the dip-coating. In the drying process, dry heat of 150° C. was applied to bake the resin-coated filament. The total amount of the resin covering the filament after the baking was set to be 40 wt. parts with respect to 100 wt. parts of filament before coating (raw yarn).

The yarns 17 to 19 were manufactured through the first manufacturing method. More specifically, in the coating process a resin solution composed of 70 wt. parts of FH-123 (polyester resin) and 30 wt. parts Dye Reducer PA No. 20 (solvent) (total 100 wt. parts) was used, and the yarn 17 was subjected to the dip-coating process in a coating resin solution composed of 100 wt. parts of such resin solution (polyester resin+solvent) and 3 wt. parts of glycerin (total 103 wt. parts).

The yarn 18 was subjected, in the coating process, to the dip-coating process in a coating resin solution of Permalyn UA-310 (polyurethane resin emulsion) without adjustment.

The yarn 19 was subjected, in the coating process, to the dip-coating process in a coating resin solution of Mowinyl 975N (styrene/acrylic emulsion) without adjustment.

For the yarns 17 to 19 respectively, a commercially available silicon resin (oil) and xylene (solvent for the oil) were mixed in a ratio of 1:1 in weight, and used as the finishing agent in the surface treatment process.

Also, the yarns 17 to 19 were respectively subjected to dry heat of 270° C. in the drying process, for baking the resin-coated filament. The total amount of the resin covering the filament after the baking was set to be 30 wt. parts with respect to 100 wt. parts of the filament before coating (raw yarn).

Hereunder, each yarn in Table 1 will be described.

First, the yarns 1 to 11 processed from the raw yarn of ultra-high polymer polyethylene will be described. As the ultra-high polymer polyethylene multifilament, Dyneema SK40 was adopted.

The yarn 1 was subjected to a preliminary twist at 855 T/M and a final twist at 726 T/M. The ratio of the number of twists between the preliminary twist and the final twist was 1.18. The result was: gross tensile strength of 11.83 Kg, tensile strength of 29.58 g/d (grams per denier, hereinafter the same shall apply), tensile elongation of 6.14%, gross knot strength of 5.75 Kg, knot strength of 14.38 g/d, knot elongation of 2.60%, and circularity (flattening ratio, hereinafter the same shall apply) of 1.15.

The yarn 2 was subjected to a preliminary twist at 726 T/M and a final twist at 619 T/M. The ratio of the number of twists between the preliminary twist and the final twist was 1.17. The result was: gross tensile strength of 12.09 Kg, tensile strength of 30.23 g/d, tensile elongation of 5.21%, gross knot strength of 5.63 Kg, knot strength of 14.08 g/d, knot elongation of 2.47%, and circularity of 1.08.

The yarn 3 was subjected to a preliminary twist at 855 T/M and a final twist at 726 T/M. The ratio of the number of twists between the preliminary twist and the final twist was 1.18. The result was: gross tensile strength of 8.68 Kg, tensile strength of 28.77 g/d, tensile elongation of 5.18%, gross knot strength of 4.06 Kg, knot strength of 13.53 g/d, knot elongation of 2.35%, and circularity of 1.11.

The yarn 4 was subjected to a preliminary twist at 855 T/M and a final twist at 726 T/M. The ratio of the number of twists between the preliminary twist and the final twist was 1.18. The result was: gross tensile strength of 7.09 Kg, tensile strength of 28.35 g/d, tensile elongation of 5.27%, gross knot strength of 2.97 Kg, knot strength of 11.88 g/d, knot elongation of 2.47%, and circularity of 1.09.

The yarn 5 was subjected to a preliminary twist at 855 T/M and a final twist at 726. T/M. The ratio of the number of twists between the preliminary twist and the final twist was 1.18. The result was: gross tensile strength of 6.12 Kg, tensile strength of 30.60 g/d, tensile elongation of 5.05%, gross knot strength of 2.91 Kg, knot strength of 14.54 g/d, knot elongation of 2.26%, and circularity of 1.12.

The yarn 6 was subjected to a preliminary twist at 855 T/M and a final twist at 726 T/M. The ratio of the number of twists between the preliminary twist and the final twist was 1.18. The result was: gross tensile strength of 4.65 Kg, tensile strength of 31.00 g/d, tensile elongation of 5.05%, gross knot strength of 2.50 Kg, knot strength of 16.65 g/d, knot elongation of 2.35%, and circularity of 1.10.

The yarn 7 was subjected to a preliminary twist at 938 T/M and a final twist at 790 T/M. The ratio of the number of twists between the preliminary twist and the final twist was 1.19. The result was: gross tensile strength of 10.21 Kg, tensile strength of 25.53 g/d, tensile elongation of 4.97%, gross knot strength of 4.56 Kg, knot strength of 11.40 g/d, knot elongation of 1.79%, and circularity of 1.09.

The yarn 8 was subjected to a preliminary twist at 176 T/M and a final twist at 148 T/M. The ratio of the number of twists between the preliminary twist and the final twist was 1.19. The result was: gross tensile strength of 11.52 Kg, tensile strength of 28.80 g/d, tensile elongation of 5.21%, gross knot strength of 5.32 Kg, knot strength of 13.30 g/d, knot elongation of 2.41%, and circularity of 1.29.

The yarn 9 was subjected to a preliminary twist at 726 T/M and a final twist at 280 T/M. The ratio of the number of twists between the preliminary twist and the final twist was 2.59. The result was: gross tensile strength of 11.43 Kg, tensile strength of 28.58 g/d, tensile elongation of 4.76%, gross knot strength of 5.58 Kg, knot strength of 13.95 g/d, knot elongation of 1.81%, and circularity of 1.20.

The yarn 10 was subjected to a preliminary twist at 726 T/M and a final twist at 715 T/M. The ratio of the number of twists between the preliminary twist and the final twist was 1.02. The result was: gross tensile strength of 11.02 Kg, tensile strength of 27.55 g/d, tensile elongation of 4.89%, gross knot strength of 4.69 Kg, knot strength of 11.73 g/d, knot elongation of 1.77%, and circularity of 1.24.

The yarn 11 was subjected to a preliminary twist at 1018 T/M, but the yarn was broken during a final twist process.

Next, the yarns 12 to 19 processed from the raw yarn of polyarylate will be described. As the polyarylate multifilament, Vectran HT220T 40 was adopted.

The yarn 12 was subjected to a preliminary twist at 855 T/M and a final twist at 726 T/M. The ratio of the number of twists between the preliminary twist and the final twist was 1.18. The result was: gross tensile strength of 11.49 Kg, tensile strength of 28.73 g/d, tensile elongation of 4.06%, gross knot strength of 4.88 Kg, knot strength of 12.20 g/d, knot elongation of 1.73%, and circularity of 1.13.

The yarn 16 was subjected to a preliminary twist at 1018 T/M, but the yarn was broken during a final twist process.

The yarn 17 was subjected to a preliminary twist at 726 T/M and a final twist at 507 T/M. The ratio of the number of twists between the preliminary twist and the final twist was 1.43. The result was: gross tensile strength of 6.95 Kg, tensile strength of 27.80 g/d, tensile elongation of 3.57%, gross knot strength of 3.43 Kg, knot strength of 13.72 g/d, knot elongation of 1.92%, and circularity of 1.06.

The yarn 18 was subjected to a preliminary twist at 726 T/M and a final twist at 507 T/M. The ratio of the number of twists between the preliminary twist and the final twist was 1.43. The result was: gross tensile strength of 7.39 Kg, tensile strength of 29.56 g/d, tensile elongation of 3.51%, gross knot strength of 3.87 Kg, knot strength of 15.48 g/d, knot elongation of 2.01%, and circularity of 1.07.

The yarn 19 was subjected to a preliminary twist at 726 T/M and a final twist at 507 T/M. The ratio of the number of twists between the preliminary twist and the final twist was 1.43. The result was: gross tensile strength of 7.24 Kg, tensile strength of 28.96 g/d, tensile elongation of 3.48%, gross knot strength of 3.90 Kg, knot strength of 15.60 g/d, knot elongation of 1.98%, and circularity of 1.06.

The yarn 13 was subjected to a preliminary twist at 176 T/M and a final twist at 148 T/M. The ratio of the number of twists between the preliminary twist and the final twist was 1.19. The result was: gross tensile strength of 11.26 Kg, tensile strength of 28.15 g/d, tensile elongation of 4.21%, gross knot strength of 4.74 Kg, knot strength of 11.85 g/d, knot elongation of 1.75%, and circularity of 1.26.

The yarn 14 was subjected to a preliminary twist at 726 T/M and a final twist at 280 T/M. The ratio of the number of twists between the preliminary twist and the final twist was 2.59. The result was: gross tensile strength of 11.03 Kg, tensile strength of 27.58 g/d, tensile elongation of 4.12%, gross knot strength of 4.96 Kg, knot strength of 12.40 g/d, knot elongation of 1.77%, and circularity of 1.21.

The yarn 15 was subjected to a preliminary twist at 26 T/M and a final twist at 715 T/M. The ratio of the number of twists between the preliminary twist and the final twist was 1.02. The result was: gross tensile strength of 11.54 Kg, tensile strength of 28.85 g/d, tensile elongation of 4.08%, gross knot strength of 3.90 Kg, knot strength of 9.75 g/d, knot elongation of 1.91%, and circularity of 1.25.

exhibited superior results of generally two digits (10 to 16 g/d), in comparison with the yarns 20 to 25 (comparative examples), which only achieved one-digit values (7 to 8 g/d). This also applies to other examples to be subsequently described. Accordingly, it is proven that the present invention provides significant improvement in knot strength.

Regarding each of the examples, particularly the yarns 1 to 7, 12, and 17 to 19 showed the circularity in the range of 1 to 1.25, made no rotation and no single yarn separation. Regarding the yarn 8 shown in Table 1, on the contrary, although the ratio of the number of twists is 1.19, which is within the range of 1.05 to 2.50, the number of preliminary twists is 176 T/M,

TABLE 2

| | TWIST | | | | | TENSILE | | | KNOT | | |
|---|---|---|---|---|---|---|---|---|---|---|---|
| | PRELIMINARY | | FINAL | | | GROSS | | ELONGA- | GROSS | | ELONGA- |
| | T/M | DIRECTION | T/M | DIRECTION | RATIO | DENIER | STRENGTH kg | STRENGTH g/d | TION % | STRENGTH kg | STRENGTH g/d | TION % |
| YARN 20 | 27 | S | 200 | Z | 1.4 | 500 | 14.02 | 28.0 | 4.12 | 3.92 | 7.8 | 1.66 |
| YARN 21 | 355 | S | 260 | Z | 1.4 | 500 | 13.29 | 26.6 | 3.73 | 3.75 | 7.5 | 1.62 |
| YARN 22 | 280 | S | 200 | Z | 1.4 | 500 | 13.88 | 27.8 | 3.86 | 3.89 | 7.8 | 1.65 |
| YARN 23 | 280 | S | 140 | Z | 2 | 500 | 13.90 | 27.8 | 3.85 | 3.85 | 7.7 | 1.52 |
| YARN 24 | 540 | S | 250 | Z | 2.2 | 500 | 12.57 | 25.1 | 3.66 | 3.82 | 7.6 | 1.89 |
| YARN 25 | 408 | S | 300 | Z | 1.4 | 500 | 13.80 | 27.6 | 4.02 | 3.95 | 7.9 | 1.72 |

The yarns 20 to 25 shown in Table 2 correspond to examples 1 to 6 of Japanese Patent Application No. 2005-56927, and constitute the comparative examples with respect to the examples of the present invention. The yarns 20 to 25 were made by ply-twisting two multifilament yarns of the same material, and exhibited good results in terms of twist reversing. The yarns 20 to 25 were all ply-twisted adopting polyarylate yarns (Vectran HT220T 40) of 500 deniers. A preliminary twist was applied in the S-direction, and the final twist was applied in the Z-direction.

For the yarns 20 to 24, a PP (chlorinated polypropylene) primer was adopted as the coating resin, and the dip-coating process was performed so as to coat 100 wt. parts of fishing line with 25 wt. parts of such resin. In the drying process, dry heat (hot air) of 120° C. was adopted. For the yarn 25, a water-based polyurethane resin (Hydran HW-333, Hydran is a registered trademark) was adopted as the coating resin, and 12 wt. parts of such resin was applied with respect to 100 wt. parts of fishing line.

The gross tensile strength, the tensile elongation, the gross knot strength and the knot elongation were measured based on JIS L 1013-1981.

As shown in Table 2, the yarn 20 has a knot strength of 7.8 g/d, the yarn 21 of 7.5 g/d, the yarn 22 of 7.8 g/d, the yarn 23 of 7.7 g/d, the yarn 24 of 7.6 g/d, and the yarn 25 of 7.9 g/d. In other words, the yarns 20 to 25 all have the knot strength between 7 and 8 g/d.

In contrast, regarding the yarns 1 to 19 shown in Table 1, representing the examples of the present invention, the knot strengths are generally close to 10 g/d or well over 10 g/d. In terms of the knot strength, the yarns 1 to 19 (examples)

i.e. less than 180 T/M, and single yarn separation was observed and the circularity was 1.29, which exceeds 1.25.

The yarn 9 was processed with the ratio of the number of twists of 2.59, which is higher than 2.5, and made more than one rotation.

Further, the yarn 10 was processed with the ratio of the number of twists of 1.02, which is lower than 1.05, and made more than one rotation.

The yarns 11 and 16 were subjected to a preliminary twist at 1018 T/M, which exceeds 1000 T/M, but the yarn was broken during the preliminary twist, and the subsequent process could not be performed.

The yarn 13 was subjected to a preliminary twist at 176 T/M, i.e. less than 180 T/M, and single yarn separation was observed and the circularity was 1.26, which exceeds 1.25.

Further, the yarn 14 was processed with the ratio of the number of twists of 2.59, which is higher than 2.5, and made more than one rotation.

Still further, yarn 15 was processed with the ratio of the number of twists of 1.02, which is lower than 1.05, and made more than one rotation.

Thus, although the yarns 8 to 11 and 13 to 16 showed improvement in knot strength, the yarns 1 to 7, 12, and 17 to 19 are superior in circularity and rotation, and hence the finished product as a fishing line is superior in terms of ease of handling.

Also, the data of the yarns 11 and 16 indicates that it is preferable to set the number of preliminary twists at 1000 T/M, in order to restrict the occurrence rate of yarn break to thereby improve the yield.

TABLE 3

| | RAW YARN | DENIER | TWIST PRELIMINARY | TWIST FINAL | RATIO | GROSS TENSILE STRENGTH GROSS STRENGTH kg | GROSS TENSILE STRENGTH STRENGTH g/d | TENSILE ELONGATION % | GROSS KNOT STRENGTH GROSS STRENGTH kg | GROSS KNOT STRENGTH STRENGTH g/d | KNOT ELONGATION % | ROTATION |
|---|---|---|---|---|---|---|---|---|---|---|---|---|
| YARN 26 | VC | 250 | 726 | 507 | 1.43 | 7.23 | 28.92 | 3.42 | 3.26 | 13.04 | 1.97 | ○ |
| YARN 27 | VC | 250 | 726 | 507 | 1.43 | 7.19 | 28.76 | 3.59 | 3.42 | 13.68 | 2.23 | ○ |
| YARN 28 | VC | 250 | 726 | | | | | | | | | |
| YARN 29 | VC | 250 | 726 | 507 | 1.43 | 7.24 | 28.96 | 3.47 | 3.22 | 12.88 | 2.11 | ○ |
| YARN 30 | VC | 250 | 726 | 507 | 1.43 | 7.27 | 29.08 | 3.39 | 3.16 | 12.64 | 2.19 | ○ |
| YARN 31 | VC | 250 | 726 | | | | | | | | | |
| YARN 32 | PE | 250 | 726 | 507 | 1.43 | 7.29 | 29.16 | 5.11 | 3.43 | 13.72 | 2.25 | ○ |
| YARN 33 | PE | 250 | 726 | | | | | | | | | |
| YARN 34 | VC | 250 | 726 | 507 | 1.43 | 7.06 | 28.24 | 3.52 | 3.54 | 14.16 | 2.09 | ○ |
| YARN 35 | VC | 250 | 726 | | | | | | | | | |
| YARN 36 | VC | 250 | 726 | 507 | 1.43 | 7.31 | 29.24 | 3.54 | 3.88 | 15.52 | 2.00 | ○ |
| YARN 37 | VC | 250 | 726 | 507 | 1.43 | 7.39 | 29.56 | 3.51 | 3.87 | 15.48 | 2.01 | ○ |
| YARN 38 | VC | 250 | 726 | 507 | 1.43 | 7.24 | 28.96 | 3.48 | 3.90 | 15.60 | 1.98 | ○ |

TABLE 4

| | RAW YARN | RESIN AMOUNT | | | | RESIN-YARN WEIGHT RATIO | ADHESION | TWIST PERFORMANCE | SMOOTH-NESS | EVALU-ATION |
|---|---|---|---|---|---|---|---|---|---|---|
| | | HV | FH | OTHER | TOTAL | | | | | |
| YARN 26 | VC | 0.135 | 0.030 | | 0.165 | 40 | ○ | | 4.6 | ○ |
| YARN 27 | VC | 0.105 | 0.090 | | 0.195 | 45 | ○ | | 5.1 | ○ |
| YARN 28 | VC | 0.075 | 0.150 | | 0.225 | 53 | ○ | YARN BREAK | | x |
| YARN 29 | VC | 0.081 | 0.018 | | 0.099 | 20 | ○ | | 4.8 | ○ |
| YARN 30 | VC | 0.054 | 0.012 | | 0.066 | 15 | ○ | | 3.0 | ○ |
| YARN 31 | VC | 0.189 | 0.042 | | 0.231 | 55 | ○ | YARN BREAK | | x |
| YARN 32 | PE | 0.054 | 0.012 | | 0.066 | 13 | x | | 4.4 | x |
| YARN 33 | PE | 0.189 | 0.042 | | 0.231 | 55 | ○ | YARN BREAK | | x |
| YARN 34 | VC | 0 | 0.420 | | 0.420 | 40 | ○ | | 4.0 | ○ |
| YARN 35 | VC | 0 | 0.600 | | 0.600 | 55 | ○ | YARN BREAK | | x |
| YARN 36 | VC | 0 | 0.420 | | 0.420 | 42 | ○ | | 3.8 | ○ |
| YARN 37 | VC | | | 0.39 | 0.390 | 40 | ○ | | 3.2 | ○ |
| YARN 38 | VC | | | 0.45 | 0.450 | 40 | ○ | | 3.6 | ○ |

Next, the yarn manufactured through the first manufacturing method will be described. Those yarns that satisfy the conditions specified primarily in the fourth aspect of the present application of the invention (according to appended claim 4) in terms of the number of raw yarn in denier, number of preliminary twists and final twists, the ratio of the number of twists, and circularity were taken up, and subjected to experiments under different application conditions of the coating resin.

Tables 3 and 4 show the data of 13 yarns, the yarn 26 to 38, obtained through the foregoing experiment. In Tables 3 and 4, VC and PE in the column of raw yarn represent polyarylate (Vectran HT220T 40) and ultra-high polymer polyethylene (Dyneema SK40), respectively. Specifically, the yarns 26 to 38 used the polyarylate (Vectran HT220T 40) as the raw yarn, except for the yarns 32 and 33 which used the ultra-high polymer polyethylene (Dyneema SK40) as the raw yarn. Unless otherwise expressed, the conditions are similar to those of the first manufacturing method (yarns 17 to 18) shown in Table 1.

As shown in Table 3, the yarns 26 to 38 were subjected to the same experiment as that of Table 1, except for the circularity. As is apparent from Table 3, the filament (raw yarn) of 250 deniers was adopted for all the yarns. The respective yarns shown in Table 3 were subjected to a preliminary twist at 726 T/M and to a final twist at 507 T/M (ratio of the number of twists is 1.43 for all cases).

As shown in Table 3, in the aspect of rotation, excellent result of less than one rotation was attained from the majority of the yarns of Table 3 (yarn 26, 27, 29, 30, 32, 34, and 36 to 38).

The surface smoothness (speed) shown in Table 4 will be described.

As shown in FIG. 1, an end of a (fishing) yarn 100 (examples and comparative example) is fixed (fixed end 1a), with a weight 2 being attached to the other end, and the weight 2 was suspended by a pulley 3, such that the yarn 100 defines an angle of 10 degrees from a horizontal plane (elevation angle θ). The weight 2 was adjusted so as to apply tension of 1 gram per denier to the yarn 1. The length w0 of the fishing line 100 from the fixed end 1a to the pulley 3 was set as 300 cm (3 meters). The thus arranged fishing line 100 was introduced through ring-shaped sliding weight 4, to thereby cause the weight 4 to slide from the position of the pulley 3 to the fixed end 1a of the fishing line 100, and the sliding time (seconds) was measured. The sliding weight 4 was made of a metal and 0.4 grams in weight and, specifically, a paper clip (gem clip, small, from Kokuyo Co., Ltd.) was used. The shorter the measuring time is, the better surface smoothness the yarn has (the smoother the yarn surface is).

Evaluations in Table 4 are on the adhesion performance, and a circle was given to those yarns that showed excellent application. Specifically, the yarns according to the examples and the comparative examples were each twisted in S-direction and Z-direction by turns until the yarn forms a bump because of twisting (10 T/cm for yarn of 250 deniers). After applying such twisting five times, visual observation was made and a circle was given to those yarns without yarn separation and nap.

As shown in Table 4, the deposition amount of the resin solid content was also measured. To measure the deposition amount of the resin solid content, the weight (number of deniers) of the filament of a predetermined length before the resin coating was measured at room temperature (22° C. to 24° C., relative humidity 63 to 67%), and after application of the resin and drying (after the entire process was performed) the yarn was left untouched for 24 hours, and then the weight (number of deniers) of the yarn (resin-coated and dried) was measured. For the measurement, 90 cm of the filament was placed on an electronic scale. Since 1 gram per 9000 meters corresponds to 1 denier, the thus measured value was converted to 9000 meters, and taken as the measured weight.

Hereunder, the examples shown in Tables 3 and 4 will be described in details.

For the yarn 26, a solution composed of a resin solution containing 90 wt. parts of PP Coat HV (HV) and 10 wt. parts of FH-123 (polyester resin) (total 100 wt. parts), and the same weight of Dye Reducer PA No. 20 (solvent) as such resin solution was used as the coating resin solution. The resin solid content (resin weight ratio after drying) was HV 0.135, polyester resin 0.030 (total 0.165) with respect to the coating resin solution as 1. Also, the deposition amount of the resin solid content was set to be 40 wt. parts with respect to 100 wt. parts of raw yarn (total 140 wt. parts; deposition amount ratio with respect to yarn weight of 40%).

The result with yarn 26 was: gross tensile strength 7.23 Kg, tensile strength of 28.29 g/d, tensile elongation of 3.42%, gross knot strength of 3.26 Kg, knot strength of 13.04 g/d, and knot elongation of 1.97%.

For the yarn 27, a solution composed of a resin solution containing 70 wt. parts of PP Coat HV (HV) and 30 wt. parts of FH-123 (polyester resin) (total 100 wt. parts), and the same weight of Dye Reducer PA No. 20 (solvent) as such a resin solution was used as the coating resin solution. The resin solid content was HV 0.105, polyester resin 0.09 (total 0.195) with respect to the coating resin solution as 1. Also, the deposition amount of the resin solid content was set to be 45 wt. parts with respect to 100 wt. parts of raw yarn (total 145 wt. parts; deposition amount ratio with respect to yarn weight of 45%).

The result with yarn 27 was: gross tensile strength of 7.19 Kg, tensile strength of 28.76 g/d, tensile elongation of 3.59%, gross knot strength of 3.42 Kg, knot strength of 13.68 g/d, and knot elongation of 2.23%.

For the yarn 29, a solution composed of 30 wt. parts of resin solution containing 90 wt. parts of PP Coat HV (HV) and 10 wt. parts of FH-123 (polyester resin) (total 100 wt. parts), and 70 wt. parts of Dye Reducer PA No. 20 (solvent) (total 100 wt. parts) was used as the coating resin solution. The resin solid content was HV 0.081, polyester resin 0.018 (total 0.099) with respect to the coating resin solution as 1. Also, the deposition amount of the resin solid content was set to be 20 wt. parts with respect to 100 wt. parts of raw yarn (total 120 wt. parts; deposition amount ratio with respect to yarn weight 20%).

The result with yarn 29 was: gross tensile strength of 7.24 Kg, tensile strength of 28.96 g/d, tensile elongation of 3.47%, gross knot strength of 3.22 Kg, knot strength of 12.88 g/d, and knot elongation of 2.11%.

For the yarn 30, a solution composed of 20 wt. parts of resin solution containing 90 wt. parts of PP Coat HV (HV) and 10 wt. parts of FH-123 (polyester resin) (total 100 wt. parts), and 80 wt. parts of Dye Reducer PA No. 20 (solvent) (total 100 wt. parts) was used as the coating resin solution. The resin solid content was HV 0.054, polyester resin 0.012 (total 0.066) with respect to the coating resin solution as 1. Also, the deposition amount of the resin solid content was set to be 15 wt. parts with respect to 100 wt. parts of raw yarn (total 115 wt. parts; deposition amount ratio with respect to yarn weight of 15%).

The result with yarn 30 was: gross tensile strength of 7.27 Kg, tensile strength of 29.08 g/d, tensile elongation of 3.39%, gross knot strength of 3.16 Kg, knot strength of 12.64 g/d, and knot elongation of 2.19%.

For the yarn 34, a solution composed of 100 wt. parts of resin solution containing 70 wt. parts of FH-123 (polyester resin) and 30 wt. parts of Dye Reducer PA No. 20 (solvent) (total 100 wt. parts), and 3 wt. parts of glycerin (total 103 wt. parts) was used as the coating resin solution. The resin solid content was 0.42 (polyester resin) with respect to the coating resin solution as 1. Also, the deposition amount of the resin solid content was set to be 40 wt. parts with respect to 100 wt. parts of raw yarn (total 140 wt. parts; deposition amount ratio with respect to yarn weight of 40%).

The result with yarn 34 was: gross tensile strength of 7.06 Kg, tensile strength of 28.24 g/d, tensile elongation of 3.52%, gross knot strength of 3.54 Kg, knot strength of 14.16 g/d, and knot elongation of 2.09%.

For the yarn 36, a solution composed of 100 wt. parts of resin solution containing 70 wt. parts of FH-123 (polyester resin) and 30 wt. parts of Dye Reducer PA No. 20 (solvent) (total 100 wt. parts), and 3 wt. parts of liquid paraffin (total 103 wt. parts) was used as the coating resin solution. The resin solid content was 0.42 (polyester resin) with respect to the coating resin solution as 1. Also, the deposition amount of the resin solid content was set to be 42 wt. parts with respect, to 100 wt. parts of raw yarn (total 142 wt. parts; deposition amount ratio with respect to yarn weight of 42%).

The result with yarn 36 was: gross tensile strength of 7.31 Kg, tensile strength of 29.24 g/d, tensile elongation of 3.54%, gross knot strength of 3.88 Kg, knot strength of 15.52 g/d, and knot elongation of 2.00%.

For the yarn 37, only Permalyn UA-310 (polyurethane resin emulsion) was used as the coating resin solution (the polyurethane resin emulsion was 100%). The resin solid content was 0.39 (polyurethane resin) with respect to the coating resin solution as 1. Also, the deposition amount of the resin solid content was set to be 40 wt. parts with respect to 100 wt. parts of raw yarn (total 140 wt. parts; deposition amount ratio with respect to yarn weight of 40%).

The result with yarn 37 was: gross tensile strength of 7.39 Kg, tensile strength of 29.56 g/d, tensile elongation of 3.51%, gross knot strength of 3.87 Kg, knot strength of 15.48 g/d, and knot elongation of 2.01%.

For the yarn 38, only Mowinyl 975N (styrene/acrylic emulsion) was used as the coating resin solution (the styrene/acrylic emulsion was 100%). The resin solid content was 0.45 (styrene resin+acrylic resin) with respect to the coating resin solution as 1. Also, the deposition amount of the resin solid content was set to be 40 wt. parts with respect to 100 wt. parts of raw yarn (total 140 wt. parts; deposition amount ratio with respect to yarn weight of 40%).

The result with yarn 38 was: gross tensile strength of 7.24 Kg, tensile strength of 28.96 g/d, tensile elongation of 3.48%, gross knot strength of 3.90 Kg, knot strength of 15.60 g/d, and knot elongation of 1.98%.

For the yarn 28, a solution composed of a resin solution containing 50 wt. parts of PP Coat HV (HV) and 50 wt. parts of FH-123 (polyester resin) (total 100 wt. parts), and the same weight of Dye Reducer PA No. 20 (solvent) as such a resin solution was used as the coating resin solution. The resin solid content was HV 0.075, polyester resin 0.15 wt. parts (total 0.225) with respect to the coating resin solution as 1. Also, the deposition amount of the resin solid content was set to be 53 wt. parts with respect to 100 wt. parts of raw yarn (total 153 wt. parts; deposition amount ratio with respect to yarn weight of 53%).

For the yarn 31, a solution composed of 70 wt. parts of resin solution containing 90 wt. parts of PP Coat HV (HV) and 10 wt. parts of FH-123 (polyester resin) (total 100 wt. parts), and 30 wt. parts of Dye Reducer PA No. 20 (solvent) (total 100 wt. parts) was used as the coating resin solution. The resin solid content was HV 0.189, polyester resin 0.042 wt. parts (total 0.231) with respect to the coating resin solution as 1. Also, the deposition amount of the resin solid content was set to be 55 wt. parts with respect to 100 wt. parts of raw yarn (total 155 wt. parts; deposition amount ratio with respect to yarn weight of 55%).

For the yarn 32, a solution composed of 20 wt. parts of resin solution containing 90 wt. parts of PP Coat HV (HV) and 10 wt. parts of FH-123 (polyester resin) (total 100 wt. parts), and 80 wt. parts of Dye Reducer PA No. 20 (solvent) (total 100 wt. parts) was used as the coating resin solution. The resin solid content was HV 0.054, polyester resin 0.012 wt. parts (total 0.066) with respect to the coating resin solution as 1. Also, the deposition amount of the resin solid content was set to be 13 wt. parts with respect to 100 wt. parts of raw yarn (total 113 wt. parts; deposition amount ratio with respect to yarn weight of 13%).

The result with yarn 32 was: gross tensile strength of 7.29 Kg, tensile strength of 29.16 g/d, tensile elongation of 5.11%, gross knot strength of 3.43 Kg, knot strength of 13.72 g/d, and knot elongation of 2.25%.

For the yarn 33, a solution composed of 70 wt. parts of resin solution containing 90 wt. parts of PP Coat HV (HV) and 10 wt. parts of FH-123 (polyester resin) (total 100 wt. parts), and 30 wt. parts of Dye Reducer PA No. 20 (solvent) (total 100 wt. parts) was used as the coating resin solution. The resin solid content was HV 0.189, polyester resin 0.042 wt. parts (total 0.231) with respect to the coating resin solution as 1. Also, the deposition amount of the resin solid content was set to be 55 wt. parts with respect to 100 wt. parts of raw yarn (total 155 wt. parts; deposition amount ratio with respect to yarn weight of 55%).

For the yarn 35, a solution composed of 100 wt. parts of FH-123 (polyester resin) and 3 wt. parts of glycerin (solvent) (total 103 wt. parts) was used as the coating resin solution. The resin solid content was 0.6 (polyester resin) with respect to the coating resin solution as 1. Also, the deposition amount of the resin solid content was set to be 55 wt. parts with respect to 100 wt. parts of raw yarn (total 155 wt. parts; deposition amount ratio with respect to yarn weight of 55%).

The foregoing yarn 28 had 53 wt. parts of resin deposition amount (solid content), which exceeds 50 wt. parts, with respect to 100 wt parts of raw yarn, and yarn break occurred upon applying the preliminary twist. Likewise, the yarns 31, 33 and 35 had 55 wt. parts of resin deposition amount (solid content), which exceeds 50 wt. parts, with respect to 100 wt. parts of raw yarn, and yarn break occurred upon applying a preliminary twist.

The yarn 32 had 13 wt. parts of resin deposition amount (solid content), which exceeds 15 wt. parts, with respect to 100 wt. parts of raw yarn, and yarn separation was observed at a plurality of locations, and the adhesion performance proved to be rather poor.

On the contrary, referring to yarns 26, 27, 29, 30, 34, and 36 to 38 in particular, all these yarns had the resin adhesion performance (solid content) within the range of 15 to 50 wt. parts with respect to 100 wt. parts of raw yarn, and exhibited excellent adhesion performance and no yarn separation or nap was observed. The yarns 26, 27, 29, 30, 34, and 36 to 38, which did not show any yarn separation or nap after being twisted 5 times in the S-direction and Z-direction by turns until the yarn forms a bump because of twisting, were further subjected to 200 times of such twisting, however still no yarn separation or nap was visually observed.

Thus, it can be confirmed that the respective foregoing yarns coated with the resin in the deposition amount (solid content) within the range of 15 to 50 wt. parts with respect to 100 wt. parts of raw yarn exhibit prominently superior adhesion performance of the resin, in comparison with other yarns.

Meanwhile, the data of the resin solid content from the yarn that suffered the yarn break was taken after natural drying, because the baking process could not be applied because of the broken yarn.

Further, although not shown in the Tables, a comparative example (yarn 40) made up by coating with a resin and applying the twist only in one direction, and an example (yarn 39) made up under the same condition as the comparative example except for being further subjected to a final twist in a different direction, were subjected to an experiment for studying the circularity.

Based on the fact that the yarn subjected to the first twist in one direction and to the second twist in a different direction in the manufacturing process according to the present invention, causes the twist reversing effect with the lapse of time, thereby reducing the number of twists of the yarn as the finished product to the value corresponding to the difference between the preliminary twist and the final twist, the significance of this experiment lies in deciding whether such yarn (yarn 39) is superior in circularity to the yarn merely twisted in one direction in the number of twists corresponding to the difference between the preliminary twist and the final twist.

The yarn 39 and the yarn 40 both adopted the polyarylate multifilament of 250 deniers as the raw yarn, or specifically Vectran HT220 40, and were subjected to the process according to the first manufacturing method.

Regarding the yarn 39, the cross-section was observed through a microscope after the processing, and it was confirmed that the final twist was barely maintained (nearly gone), because of the twist reversing effect.

The yarn 39 was subjected to a preliminary twist at 726 T/M, and to a final twist at 507 T/M, and hence the ratio of the number of twists was 1.43. As a result, the yarn 39 showed the circularity of 1.12.

The yarn 40 was twisted (preliminary twist) at 210 T/M (nearly equal to 726 T/M-507 T/M). As a result, the yarn 40 showed the circularity of 1.35.

Regarding the yarn 39 and 40 also, the manufacturing conditions are similar to those of the yarns 26 to 38 shown in Tables 3 and 4, unless expressly specified.

As above, the circularity of the yarn 40 is 1.35, which is well beyond 1.25. This indicates that the yarn surface is quite flat. The fishing line of such a shape often causes a line trouble. On the other hand, although the yarn 39 only maintains the preliminary twist because of the twist reversing effect, the circularity 1.12 which is an excellent value. Thus, it is understood that applying the twists in the predetermined two directions (preliminary twist and final twist) in the manufacturing process allows achieving satisfactory circularity of the finished product, even though the twist reversing takes place due to the preliminary twist and final twist in the finished product.

It can be thus confirmed that, even though the yarn 39 and the yarn 40 are under the same condition as finished products, the yarn 39 which was subjected to the twisting in different directions in the manufacturing process becomes superior in ease of handling as fishing line, to the yarn 40 which was twisted only in one direction.

Also, although not shown in Tables as above, a yarn 41 which is a fishing line manufactured through the second manufacturing method, and a yarn 42 which is a fishing line manufactured through the fourth manufacturing method, will be described.

The yarn 41 adopted Dyneema as the raw yarn, and a resin composed of 100 wt. parts of urethane resin (Polyurex Sanding Sealer X-222E) and 10 wt. parts of solvent (Dye Reducer PA No. 20) (total 110 wt. parts) was used as the coating resin in the coating process. With the yarn 41, the resin deposition amount after drying was set to be 20 wt. parts with respect to 100 wt. parts of raw yarn. Also, in the resin addition process for the yarn 41, 30 wt. parts of HV (PP Coat HV) and 70 wt. parts of solvent (Dye Reducer PA No. 20) (total 100 wt. parts) was further adopted as the coating resin. Then the resin deposition amount on the yarn 41 after drying was set to be 20 wt. parts with respect to 100 wt. parts of raw yarn. Accordingly, in the yarn 41, the total resin deposition amount through the coating process and the resin addition process is 40 wt. parts with respect to 100 wt. parts of raw yarn. In the drying process of the yarn 41, dry heat of 180° C. was applied for baking, and dry heat of 150° C. was applied for baking in the secondary drying process.

The yarn 41 was subjected to the preliminary twist at 720 T/M and the final twist at 501 T/M, and the ratio of the number of twists between the preliminary twist and the final twist was 1.44. The result with the yarn 41 was: gross tensile strength of 7.05 Kg, tensile strength of 28.30 g/d, tensile elongation of 4.99%, gross knot strength of 3.67 Kg, knot strength of 14.56 g/d, knot elongation of 1.83%, and circularity of 1.11. The manufacturing conditions not specifically indicated are similar to those of the yarns shown in Tables 3 and 4.

The yarn 42 adopted Dyneema as the raw yarn, and a resin composed of 50 wt. parts of urethane resin (Polyurex Sanding Sealer X-222E) and 50 wt. parts of polyester (FH-123) (total 100 wt. parts) was used as the coating resin in the coating process. The resin deposition amount after drying was set to be 20 wt. parts with respect to 100 wt. parts of raw yarn. Also, in the resin addition process for the yarn, 30 wt. parts of urethane resin (Polyurex Sanding Sealer X-222E) and 70 wt. parts of acrylic resin (Polyauto Clear) (total 100 wt. parts) was further adopted as the coating resin. Then the resin deposition amount after drying was set to be 20 wt. parts with respect to 100 wt. parts of raw yarn. Accordingly, the total resin deposition amount through the coating process and the resin addition process is 40 wt. parts with respect to 100 wt. parts of raw yarn. In the drying process, dry heat of 180° C. was applied for baking, and dry heat of 150° C. was applied for baking in the secondary drying process.

The yarn 42 was subjected to the preliminary twist at 729 T/M and the final twist at 510 T/M, and the ratio of the number of twists between the preliminary twist and the final twist was 1.43. The result with the yarn 42 was: gross tensile strength of 7.06 Kg, tensile strength of 28.22 g/d, tensile elongation of 4.50%, gross knot strength of 3.77 Kg, knot strength of 14.51 g/d, knot elongation of 1.81%, and circularity of 1.13. Regarding the yarn 42 also, the manufacturing conditions not specifically indicated are similar to those of the yarns shown in Tables 3 and 4.

In view of the yarns 41 and 42, it is understood that the fishing lines manufactured according to the second and the fourth manufacturing method can also exhibit remarkably superior knot strength and circularity, in comparison with the comparative examples shown in Table 2 (yarns 20 to 25).

Further, Table 5 shows test results from yarns manufactured according to the first manufacturing method, utilizing the raw yarn of the same denier number, in the same number of preliminary and final twists and the ratio thereof and circularity, but with different coating resins.

TABLE 5

| | RAW YARN | DENIER | TWIST PRELIMINARY | FINAL | RATIO | GROSS TENSILE STRENGTH GROSS STRENGTH kg | STRENGTH g/d |
|---|---|---|---|---|---|---|---|
| YARN 43 | PE | 250 | 545 | 380 | 1.43 | 7.31 | 29.24 |
| YARN 44 | PE | 250 | 545 | 380 | 1.43 | 7.19 | 28.76 |
| YARN 45 | PE | 250 | 545 | 380 | 1.43 | 7.23 | 28.92 |

| | TENSILE ELONGATION % | GROSS KNOT STRENGTH GROSS STRENGTH kg | STRENGTH g/d | KNOT ELONGATION % | ROTATION |
|---|---|---|---|---|---|
| YARN 43 | 4.88 | 3.63 | 14.52 | 2.01 | ○ |
| YARN 44 | 4.39 | 3.77 | 15.08 | 1.95 | ○ |
| YARN 45 | 4.33 | 3.62 | 14.48 | 1.99 | ○ |

The yarns 43 to 45 shown in Table 5 all adopted Dyneema SK40 as the ultra-high polymer polyethylene multifilament raw yarn. The thickness of the multifilament of the yarns 43 to 45 was 250 deniers.

The yarns 43 to 45 were each subjected to a preliminary twist at 545 T/M and a final twist at 380 T/M, and the ratio of the number of twists between the preliminary twist and the final twist was 1.43.

For the yarn 43, a resin containing a polyethylene emulsion was adopted as the coating resin. Specifically, Narucoat JW PE301 was used for the yarn 43.

As shown in Table 5, the properties of the yarn 43 were: gross tensile strength of 7.31 Kg, tensile strength of 29.24 g/d, tensile elongation of 4.88%, gross knot strength of 3.63 Kg, knot strength of 14.52 g/d, and knot elongation of 2.01%.

For the yarn 44, a resin containing a hot-melt polyamide emulsion was adopted as the coating resin. Specifically, Grirltex 1500A was used for the yarn 44.

As shown in Table 5, the properties of the yarn 44 were: gross tensile strength of 7.19 Kg, tensile strength of 28.76 g/d, tensile elongation of 4.39%, gross knot strength of 3.77 Kg, knot strength of 15.08 g/d, and knot elongation of 1.95%.

For the yarn 45, a resin containing an ethylene acrylic acid copolymer sodium salt was adopted as the coating resin. Specifically, Zaikthene-N was adopted for the yarn 45.

As shown in Table 5, the properties of the yarn 45 were: gross tensile strength of 7.23 Kg, tensile strength of 28.92 g/d, tensile elongation of 4.33%, gross knot strength of 3.62 Kg, knot strength of 14.48 g/d, and knot elongation of 1.99%.

As is apparent from Table 5, the yarns 43 to 45 exhibited good results also in rotation, as a result of the test performed as already described referring to Table 1. Accordingly, it is understood that the yarns 43 to 45 barely cause a line trouble when used as the fishing line. Regarding the yarns 43 to 45, the manufacturing conditions not specifically indicated are similar to those of the yarns shown in Tables 3 and 4.

For the yarn 43 Narucoat JW PE301 was adopted, and therefore a temporary baking process was performed after the preliminary twist process and before a final twist process. The yarn 43 was baked by dry heat of 80° C. in the temporary baking process.

Upon evaluating the adhesion performance as in Table 4 with respect to the yarn 43, no yarn separation or nap was observed, even after 200 times of twisting in S-direction and Z-direction by turns to the extent that a bump was formed because of twisting.

Further, although not included in the Tables, a yarn 46, which was not subjected to the temporary baking process, was studied. The yarn 46 was processed in the same way as the yarn 43, except that the temporary baking process was omitted. Specifically, the yarn 46 was processed according to the first manufacturing method, adopting Dyneema SK40 of 250 deniers as the raw yarn, and Narucoat JW PE301 was used as the coating resin. The yarn 46 was subjected to a preliminary twist at 545 T/M and a final twist at 380 T/M. The ratio of the number of twists between the preliminary twist and the final twist was 1.43. The result with the yarn 46 was: gross tensile strength of 7.18 Kg, tensile strength of 28.72 g/d, tensile elongation of 4.38%, gross knot strength of 3.60 Kg, knot strength of 14.38 g/d, and knot elongation of 2.00%.

However, upon repeating 100 times of twisting in the S-direction and Z-direction by turns to the extent that a bump was formed because of twisting on the yarn 46, in order to evaluate the adhesion performance as with the yarn 43, yarn separation and nap were observed.

Also, upon performing the temporary baking process over Narucoat JW PE301 at a temperature lower than 65° C., for example 60° C. (other conditions are the same as those for the yarn 43), yarn separation and nap were observed after 100 times of twisting in the S-direction and Z-direction by turns to the extent that a bump was formed because of twisting in order to evaluate the adhesion performance.

Thus, the yarns according to the examples of the present invention are generally superior in knot strength, although the characteristics of each yarn are different, to the yarns according to the comparative examples.

The respective aspects of the present invention contribute to improving the knot strength of a multifilament yarn, and allow securing high circularity (low flattening ratio) of the yarn. The present invention offers the foregoing advantages to yarn products in general, such as a fishing line, guts of a tennis racket, an embroidery thread, a sewing thread, a rope, a yarn used as the core of a curl-cord strap for a mobile phone (a fishing net, a safety net), and with respect to the fishing line in particular, the present invention provides a yarn superior in knot strength, and capable of minimizing line trouble such as becoming tangled with the guide of the fishing rod.

Thus, the present invention improves the knot strength of various yarns including a fishing line. The present invention also allows securing practically acceptable circularity of a yarn.

The invention claimed is:

1. A twisted yarn comprising a multifilament having two different direction twists, and a coating resin that covers a surface of the multifilament;

wherein the multifilament having two different direction twists, i.e., a first twist in one direction, and a second twist in a direction opposite to that of the first twist, is structured such that the multifilament is not doubled with another yarn.

2. The yarn according to claim 1, wherein the coating resin is either applied to a surface of the multifilament, or intrudes among each single constituent of the multifilament.

3. The yarn according to claim 1, wherein the coating resin is applied to a surface of the multifilament, after the yarn is subjected to the first twist and before the yarn is subjected to the second twist.

4. The yarn according to claim 1, wherein the multifilament is predominantly composed of ultra-high molecular weight polyethylene or a polyarylate; a ratio of the number of twists between the first twist and the second twist is not less than 1.05 and not more than 2.5; and the number of twists of the first twist is in a range of 180 to 1000 T/M; the coating resin is a thermoplastic resin; and a deposition amount of the coating resin is 15 to 50 wt. parts with respect to 100 wt. parts of the multifilament.

5. The yarn according to claim 1, having a flattening ratio not less than 1 and not more than 1.25.

6. Method of manufacturing a yarn, comprising coating a surface of a multifilament with a resin; applying a first twist to the multifilament in one direction, and applying a second twist to the multifilament in an opposite direction, without doubling the yarn with another yarn, and wherein the ratio of the number of twists between the first twist and the second twist is not less than 1.05 and not more than 2.5.

7. The yarn according to claim 2, wherein the multifilament is predominantly composed of ultra-high molecular weight polyethylene or a polyarylate; a ratio of the number of twists between the first twist and the second twist is not less than 1.05 and not more than 2.5; and the number of twists of the first twist is in a range of 180 to 1000 T/M; the coating resin is a thermoplastic resin; and a deposition amount of the coating resin is 15 to 50 wt. parts with respect to 100 wt. parts of the multifilament.

8. The yarn according to claim 3, wherein the multifilament is predominantly composed of ultra-high molecular weight polyethylene or a polyarylate; a ratio of the number of twists between the first twist and the second twist is not less than 1.05 and not more than 2.5; and the number of twists of the first twist is in a range of 180 to 1000 T/M; the coating resin is a thermoplastic resin; and a deposition amount of the coating resin is 15 to 50 wt. parts with respect to 100 wt. parts of the multifilament.

9. The yarn according to claim 2, having a flattening ratio not less than 1 and not more than 1.25.

10. The yarn according to claim 3, having a flattening ratio not less than 1 and not more than 1.25.

11. The yarn according to claim 4, having a flattening ratio not less than 1 and not more than 1.25.

12. A yarn multifilament having two different direction twists, comprising:
   a coating resin covering a surface thereof;
   wherein the multifilament having two different direction twists, i.e., a first twist in one direction, and a second twist in a direction opposite to that of the first twist, is structured such that the multifilament is not doubled with another yarn.

13. Method of manufacturing a yarn multifilament, comprising coating a surface of a filament with a resin; applying a first twist to the filament in one direction, and applying a second twist to the filament in an opposite direction, without doubling the filament with another yarn, and
   wherein the ratio of the number of twists between the first twist and the second twist is not less than 1.05 and not more than 2.5.

14. A twisted yarn comprising a multifilament having two different direction twists, and a coating resin that covers a surface of the multifilament,
   wherein the coating resin is made of two different coating resins, and
   wherein the multifilament having two different direction twists, i.e., a first twist in one direction, and a second twist in a direction opposite to that of the first twist, is structured such that the multifilament is not doubled with another yarn and has both different direction twists in the same multifilament.

15. A twisted yarn comprising a multifilament having two different direction twists, and a coating resin that covers a surface of the multifilament,
   wherein the multifilament having two different direction twists, i.e., a first twist in one direction, and a second twist in a direction opposite to that of the first twist, is structured such that the multifilament is not doubled with another yarn and has both different direction twists in the same multifilament, and a twist hump.

16. The twisted yarn of claim 14, wherein the multifilament that has two different direction twists has a twist bump.

17. A method of manufacturing a yarn multifilament, comprising:
   applying a first twist to a filament in one direction;
   coating the filament with a first resin;
   applying a second twist to the filament in an opposite direction, without doubling the filament with another yarn; and
   coating the filament with a second resin,
   wherein the ratio of the number of twists between the first twist and the second twist is not less than 1.05 and not more than 2.5.

18. The method according to claim 17, further comprising the step of heating the filament after applying the first resin.

\* \* \* \* \*